United States Patent
Shmulevich et al.

(10) Patent No.: US 9,646,064 B2
(45) Date of Patent: May 9, 2017

(54) TEMPLATE BASED SOFTWARE CONTAINER

(71) Applicant: salesforce.com, inc., San Francisco, CA (US)

(72) Inventors: Igor Shmulevich, San Ramon, CA (US); Richard Perry Pack, III, San Francisco, CA (US); Walter Macklem, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 14/750,320

(22) Filed: Jun. 25, 2015

(65) Prior Publication Data

US 2016/0170743 A1    Jun. 16, 2016

Related U.S. Application Data

(60) Provisional application No. 62/090,284, filed on Dec. 10, 2014.

(51) Int. Cl.
*G06F 9/445* (2006.01)
*G06F 17/30* (2006.01)
*G06F 9/44* (2006.01)

(52) U.S. Cl.
CPC ........... *G06F 17/3056* (2013.01); *G06F 8/30* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |

(Continued)

*Primary Examiner* — Adam Lee
(74) *Attorney, Agent, or Firm* — Schwabe Williamson & Wyatt

(57) ABSTRACT

A hierarchical template framework may include lower tier templates that identify groups of software components for discrete software services. The template framework also may include upper tier templates that include one or more lower tier templates and identify software components for a prearranged group of the software services configured to support and operate with an associated category of core software functions. A software developer may build a software application from the software components identified in a selected upper tier template, lower tier templates, and any other core software components identified for the core software functions. The templates prevent the software developer from having to manually locate and test all of the software components for different software services used in a software application.

14 Claims, 6 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,589,691 B1 * | 11/2013 | Hackborn ............. H04L 9/3263 713/176 |
| 8,646,103 B2 | 2/2014 | Jakobson et al. |
| 8,863,156 B1 * | 10/2014 | Lepanto ............. G06F 9/44521 719/328 |
| 2001/0044791 A1 | 11/2001 | Richter et al. |
| 2002/0038449 A1 * | 3/2002 | Green ...................... G06F 8/20 717/100 |
| 2002/0072951 A1 | 6/2002 | Lee et al. |
| 2002/0082892 A1 | 6/2002 | Raffel et al. |
| 2002/0095650 A1 * | 7/2002 | Green ...................... G06F 8/20 717/104 |
| 2002/0104067 A1 * | 8/2002 | Green ...................... G06F 8/24 717/101 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0192027 A1 * | 10/2003 | Porter ...................... G06F 8/34 717/100 |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |

(56) References Cited

U.S. PATENT DOCUMENTS

| | | |
|---|---|---|
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0138032 A1* | 6/2005 | O'Rourke ............ H04M 7/0033 |
| 2008/0005721 A1* | 1/2008 | Harvey ..................... G06F 8/36 717/107 |
| 2008/0249972 A1 | 10/2008 | Dillon |
| 2008/0270977 A1* | 10/2008 | Nucci ....................... G06F 8/10 717/105 |
| 2008/0301626 A1* | 12/2008 | Sivaram ................... G06F 8/10 717/104 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0210858 A1* | 8/2009 | Son ........................... G06F 8/10 717/121 |
| 2010/0185725 A1* | 7/2010 | Camarillo ......... H04L 29/06027 709/203 |
| 2011/0041118 A1* | 2/2011 | Wen .......................... G06F 8/71 717/120 |
| 2011/0209140 A1* | 8/2011 | Scheidel ................... G06F 8/61 717/172 |
| 2011/0218958 A1 | 9/2011 | Warshavsky |
| 2011/0239195 A1* | 9/2011 | Lin .......................... G06F 8/71 717/126 |
| 2011/0247051 A1 | 10/2011 | Bulumulla |
| 2011/0271251 A1* | 11/2011 | Buckley ............... G06F 21/629 717/120 |
| 2012/0042218 A1 | 2/2012 | Cinarkaya |
| 2012/0210296 A1* | 8/2012 | Boulter .............. G06Q 10/0631 717/107 |
| 2012/0216175 A1* | 8/2012 | Ross ........................ G06F 8/30 717/109 |
| 2012/0233137 A1 | 9/2012 | Jakobson et al. |
| 2012/0290407 A1 | 11/2012 | Hubbard et al. |
| 2013/0047137 A1* | 2/2013 | Bak .......................... G06F 8/71 717/121 |
| 2013/0152047 A1* | 6/2013 | Moorthi ................ G06F 11/368 717/124 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0219429 A1* | 8/2013 | Hirsch ...................... G06F 8/20 725/37 |
| 2013/0232480 A1* | 9/2013 | Winterfeldt ............... G06F 8/60 717/177 |
| 2013/0247005 A1* | 9/2013 | Hirsch ...................... G06F 8/71 717/121 |
| 2013/0247216 A1 | 9/2013 | Cinarkaya |
| 2013/0263080 A1* | 10/2013 | Karnik ..................... G06F 8/61 717/104 |
| 2013/0305218 A1* | 11/2013 | Hirsch ...................... G06F 8/36 717/106 |
| 2013/0326471 A1* | 12/2013 | Nucci ....................... G06F 8/10 717/105 |
| 2014/0075565 A1* | 3/2014 | Srinivasan ............ H04L 63/104 726/26 |
| 2014/0165119 A1* | 6/2014 | Liu ...................... H04N 21/232 725/92 |
| 2014/0165165 A1* | 6/2014 | Story, Jr. .................. H04L 63/08 726/6 |
| 2014/0351686 A1* | 11/2014 | Yawn ..................... G06F 17/248 715/230 |
| 2014/0359537 A1 | 12/2014 | Jackobson et al. |
| 2015/0220492 A1* | 8/2015 | Simeonov ......... G06F 17/30893 715/235 |

* cited by examiner

TEMPLATE BASED SOFTWARE CONTAINER

CLAIM OF PRIORITY

This application claims the benefit of U.S. Provisional Patent Application 62/090,284 entitled: LIGHTWEIGHT SERVICE CONTAINER THAT SUPPORTS RAPID DESIGN, BUILD AND DEPLOYMENT OF APPLICATIONS AND SERVICES by Igor Shmulevich et al., filed Dec. 10, 2014, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to hierarchical templates for developing software applications.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Software developers face a daunting task managing software components when building software applications. For example, a software developer may combine dozens or hundreds of preexisting software components together to build a Java based software application. The software components may have different versions and different dependencies stored in different software libraries.

After identifying the correct software components, the developer faces the additional time consuming task of testing the software application to ensure the software components operate correctly together on the intended platform. The testing process becomes even more complex when the software application is integrated into a larger legacy software system with hundreds of existing legacy software applications. After testing, the software developer still may only launch the new software application in conjunction with a next scheduled release for the legacy software system. Thus, software developers may find it difficult to quickly develop and launch new software applications.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
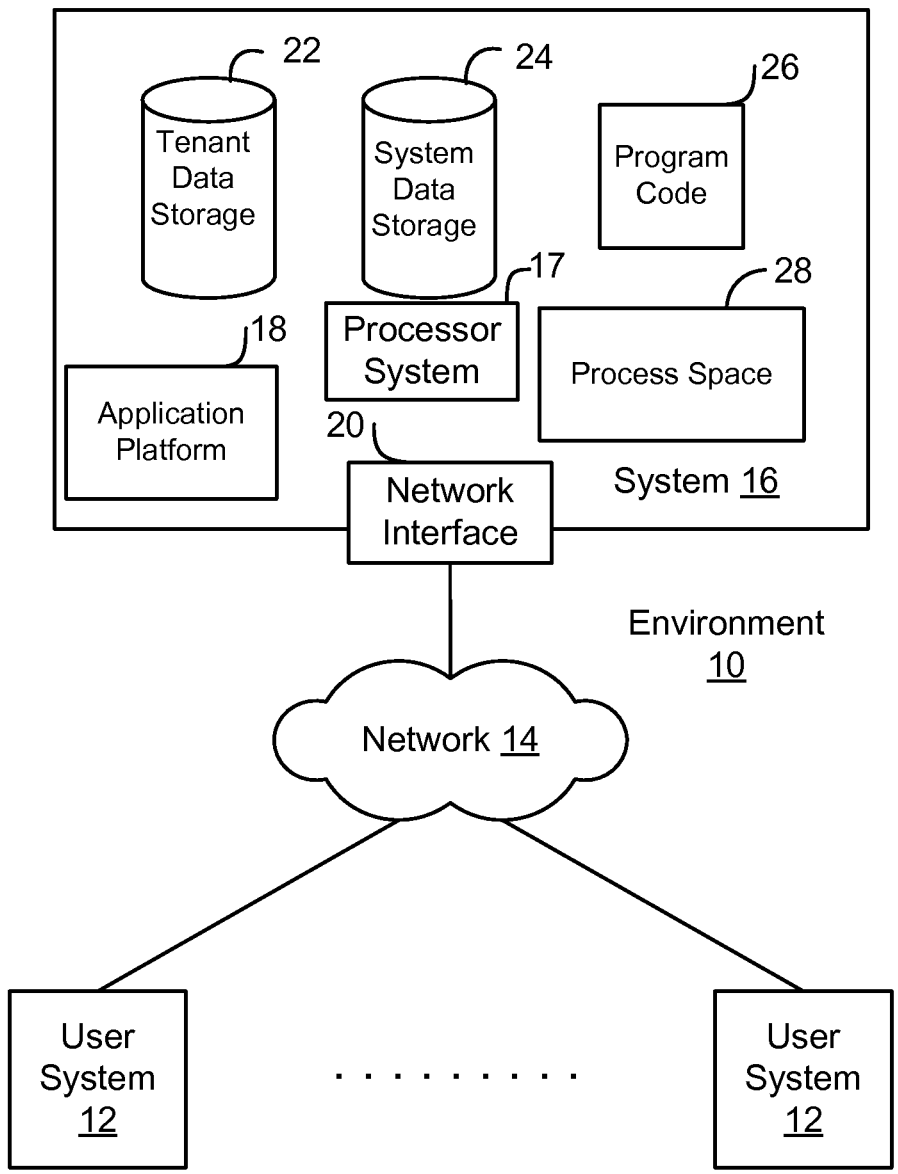
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
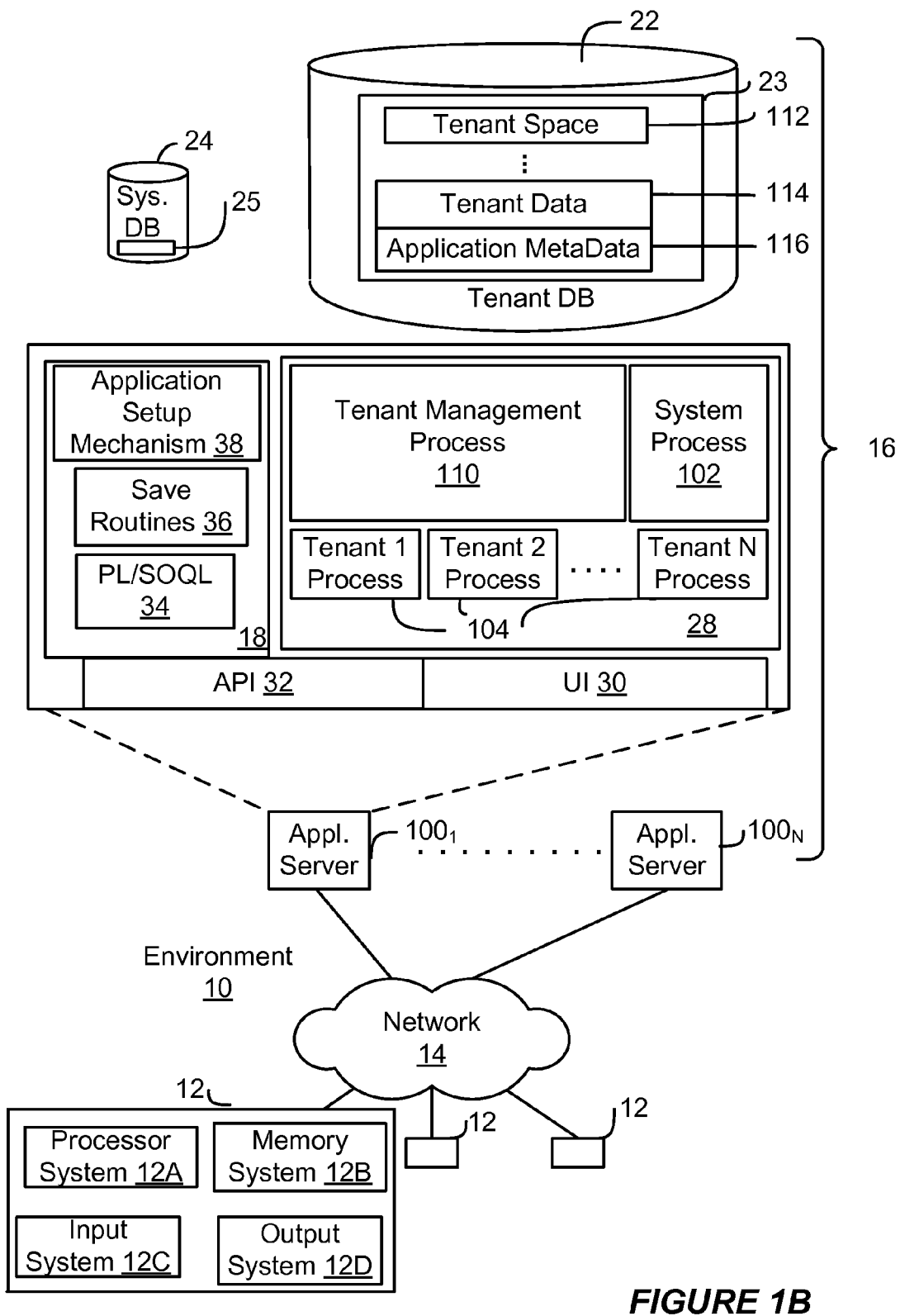
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Template Based Software Container

A hierarchical template framework uses templates to build software applications. The templates identify groups of software components for previously built and previously tested software services. The hierarchical template framework may include upper tier templates that build a container of support services for a core software application functions.

The upper tier templates may include other lower-tier templates identifying sub-groups of software components associated with lower tier software services that may operate within the container. The template framework relieves software developers from the time consuming task of manually locating and testing all of the different software components needed for creating new software applications.

The template framework may build new software applications independently but in conjunction with legacy software systems. The template may provide a set of support services for operating the application with the legacy software system. The prearranged set of services may relieve software developers from some of the typical integration and testing typically performed when adding new software applications to legacy software systems and enable new software applications to be launched independently of pre-scheduled legacy system release dates.

Figure 2:
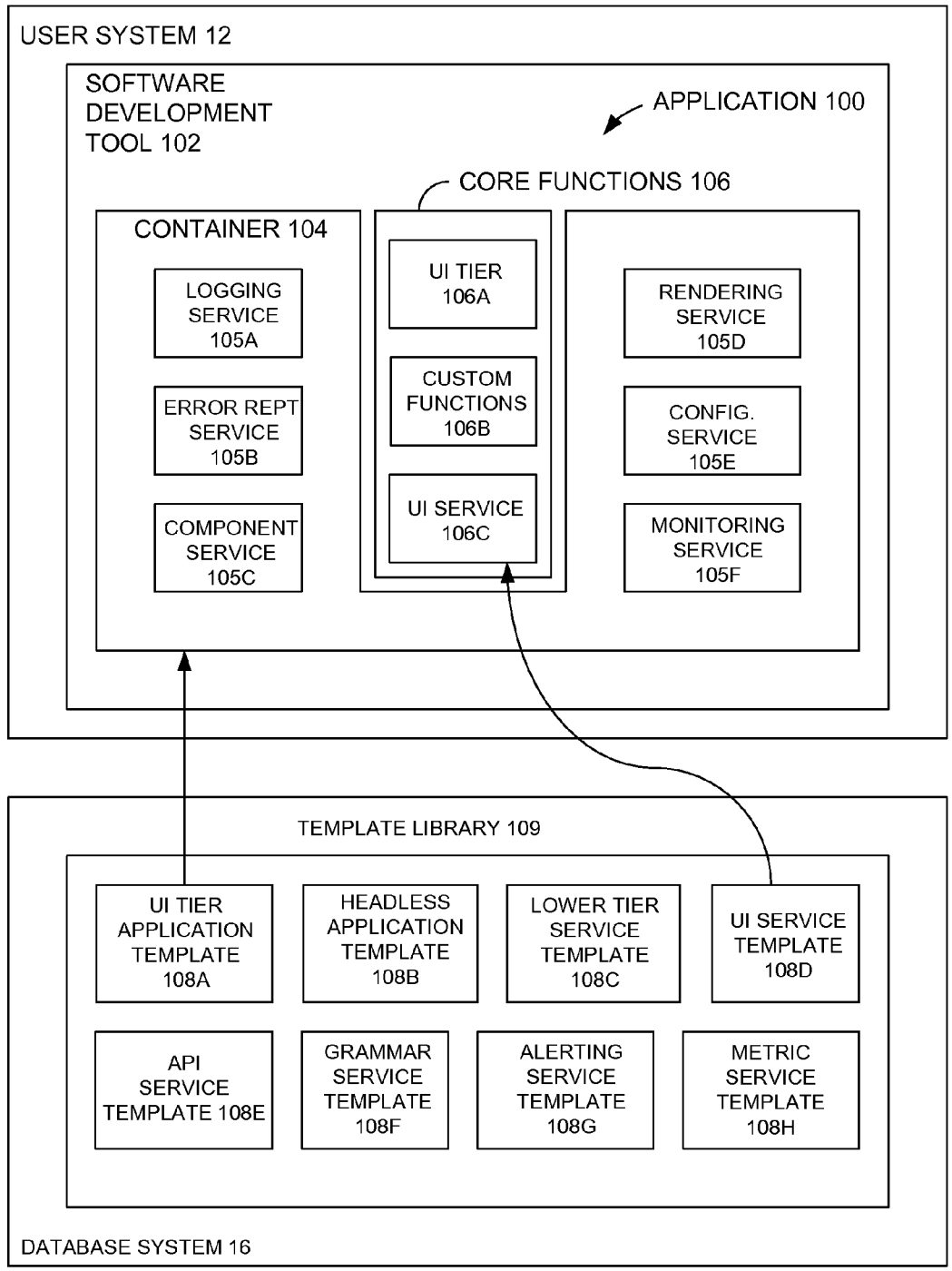
FIG. 2 shows an example template based framework accordingly to some implementations.

FIG. 2 shows a hierarchical template framework. Database system 16 described above in FIGS. 1A and 1B may store a library 109 of different templates 108. A software developer may use a software development tool 102 operating within database system 16 to access templates 108 and build an associated software application 100. The software developer may access software development tool 102 via a user interface operating on a user system 12 as described above in FIGS. 1A and 1B. Example software development tools 102 may include the Maven Apache software provided by The Apache Software Foundation, 1901 Munsey Drive, Forest Hill, Md. 21050-2747; and/or Github provided by GitHub Inc.

Templates 108 identify different groups of software components for building different software applications and services. For example, template 108A may identify software components for building a UI tier application and template 108B may identify software components for building a headless application template. Template 108C may identify software components for building a lower tier service used in either template 108A or 108B.

Template 108D may identify software components for a specific UI service that may operate within the UI tier application associated with template 108A, template 108E may identify software components for an application programming interface (API) service, template 108F may identify software components for a grammar service, template 108G may identify software components for an alerting service, and template 108H may identify software components for a metric service. Of course these are just examples and templates 108 may identify software components for building any software application or service.

Library 109 may include different upper tier application templates such as templates 108A and 108B and lower tier templates such as lower tier service template 108C and UI service template 108D. Upper tier templates may build a container 104 of general support services 105 used by core application functions 106. For example, a software developer may use a same set of support services 105 for different customized core functions 106. In one example, container 104 may include all of the services 105 needed for core functions 106 to operate in conjunction with an enterprise system.

In this example, template 108A identifies software components for a logging service 105A, error reporting services 105B, component service 105C, rendering service 105D, configuration service 105E, and monitoring service 105F. Template 108A may include any other service or module needed for building, launching, and/or running application 100.

Template 108A may include a core UI tier function 106A and the software developer may add additional custom functions 106B. For example, the software developer may write custom Java code 106B for a new CPU utilization function that operates within application 100. The software developer also may select additional templates 108 for adding additional services to application 100. For example, the software developer may select template 108D to add UI service 106C to application 100.

Templates 108 may include extensible markup language (xml) code and a project object model (POM) that identify software components, dependencies, libraries, etc. in different repositories. Software development tool 102 may use the xml and POM for UI tier template 108A, UI service template 108D, and custom functions 106B to download identified software components from the repositories into a directory. Template 108D then uses the downloaded software components to build application 100.

The software developer selects templates 108 by copying associated blocks of xml into a program directory. In another example, software development tool 102 may display icons associated with templates 108. In response to selecting the icons, software development tool 102 may automatically copy the xml for the associated template 108 into the program directory.

The following shows one example portion of template 108A that includes lower tier templates for logging service 105A and monitoring service 105F.

```
<project>
    <dependency>
        <groupId>com.entity</groupId>
        <artifactId>logging-service <artifactId>
        <version>1</version>
    </dependency>
    <dependency>
        <groupId>com.entity</groupId>
        <artifactId>monitoring-service <artifactId>
        <version>1</version>
    </dependency>
```

The templates may include separate dependencies that each include a group identifier for a project group, an artifact identifier of the project, and a version of the artifact under the specified group. In one example, the templates are expressed on a Maven pom.xml-style and used for a coarse-grained dependency management.

Templates 108 are used for building "out of the box previously built and previously tested fully functional software applications and services. Lower tier templates 108 prevent software developers from manually locating all of the individual software components used for a discrete software service. Upper tier templates, such as template 108A, further relieve software developers from identifying, locating, and testing the software components for an entire prearranged group of support services 105 used by a particular category of core functions 106. The software developer may create new software application 100 simply by selecting appropriate core functions 106.

System level changes can be made to support services 105 without modifying underlying core functions 106. For example, a developer may modify one of services 105 in template 108A. Software developers can then use the same template 108A that includes the updated service 105 to rebuild all related applications 100. Thus, software developers may no longer need to redesign and retest each software application 100 for each new software update.

Figure 3:
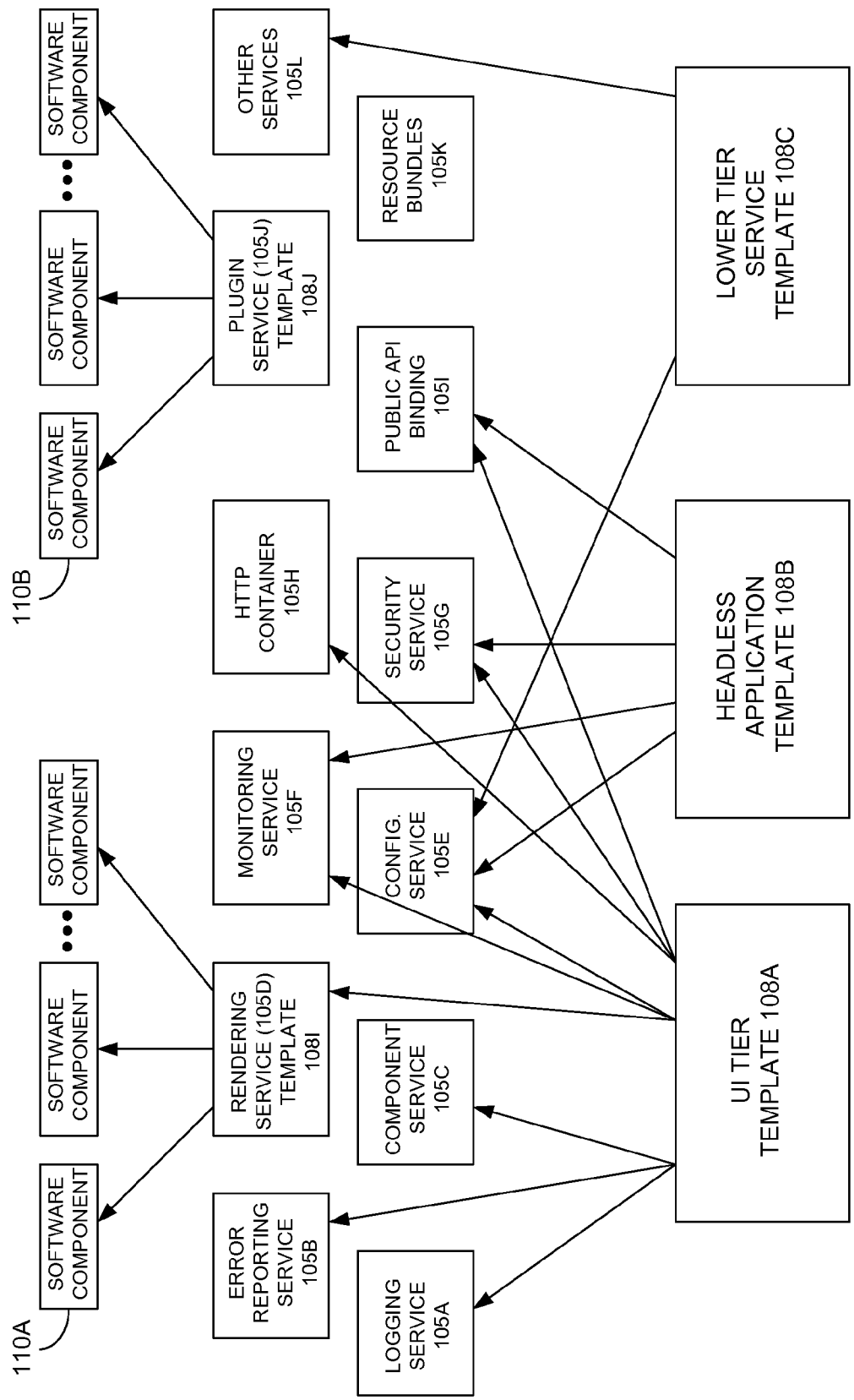
FIG. 3 shows example templates linked to different software services.

FIG. 3 shows in more detail templates 108 linked to software components for different software services 105. As explained above, template 108A identifies groups of software components for a UI tier application. Template 108B identifies software components for a headless application that does not include a user interface, and template 108C identifies software components for a lower tier service.

Templates 108 may link and download software components for associated services 105 into a program directory. For example, UI tier template 108A may include xml that links and downloads software components for logging service 105A, error reporting service 105B, component service 105C, configuration service 105E, monitoring service 105F, security service 105G, HTTP container 105H, and public API binding service 110I.

Some templates 108 are hierarchical and may include one or more sub tier templates 108. For example, UI tier template 108A includes sub tier templates 108I and 108J. In this example, sub tier template 108I includes xml that links and downloads software components 110A for a rendering service 105D and sub tier template 108J includes xml that links and downloads software components 110B for building a plugin service 105J.

Template 108A represents a first application category that includes a user interface and template 108B represents a second application category that does not use a user interface. Template 108B may link to a second set of software components for a second set of support services 105E, 105F, 105G, and 105I used by software applications that do not include a user interface. With no user interface, headless application template 108B use as smaller group of software services 105 than UI tier template 108B.

Lower tier service template 108C represents a third general software application category for creating lower tier services. A software developer may use template 108C to create individual services 105 that operate within the containers formed by upper tier templates 108A and 108B. For example, a software developer may use service template 108C to create a service that renders a specific form or webpage based on metadata such as a form number, field value, date, client name, etc.

Service template 108C may identify software components for a relatively small set of software services, such as for configuration services 105E and other basic services 105L. Lower tier service template 108C also may include even lower tier templates that identify an out of the box set of software components for micro-services.

Templates 108 may link to open source software components 110 stored in public repositories and/or link to proprietary software components 110 stored in private repositories. The xml in templates 108 may initiate web requests that download and package software components 110 from the repositories into a single uber jar with a digital signature that ensures integrity of the application. The uber jar may include java classes opened from other java jars. Some templates 108 may link to some of the same software components 110. Templates 108 may remove redundant software components 110 from the same application.

Figure 4:
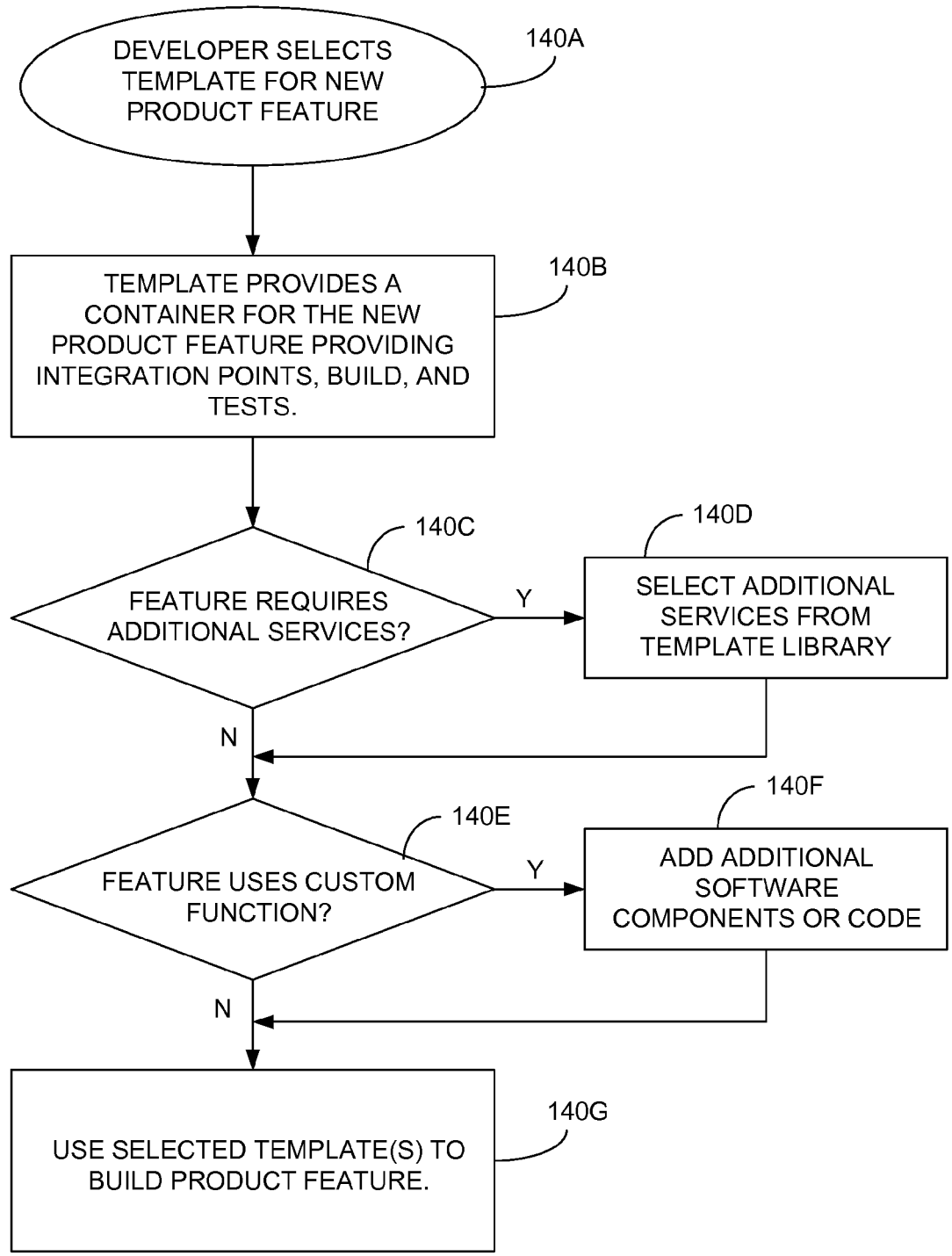
FIG. 4 shows an example process for using templates to build a software application.

FIG. 4 depicts an example process for creating a template based product feature. The software developer in operation 140A accesses the template library shown in FIG. 2 to create a new product feature or any other type of software application. For example, the software developer may select an upper tier template, such as template 108A or 108B shown in FIG. 3 or select a lower tier template such as template 108C in FIG. 3.

In operation 140B, the xml in the selected template identifies software component names, versions, and dependencies for the new product feature. The selected template may provide a container or shell for the new product feature that includes integration points, build, and tests. As mentioned above, the container also may include support services used by the product feature for operating with a larger enterprise software system.

In operation 140C, the template selected by the developer may require additional software services. If so, the developer in operation 140D may select additional templates providing the additional services. For example, the software developer in FIG. 2 selected template 108D for additional UI service 106C.

In operation 140E, the software developer may want to add custom core functions to the product feature that are not provided by any of the templates in the template library. In operation 140F, the software developer may write custom software and add additional xml that accesses the custom software. For example, in FIG. 2 the software developer added custom functions 106B.

In operation 140G, the selected templates are used to build the software product features. For example, the software development tool 102 in FIG. 2 uses the xml in the selected templates to download software components and build the associated software application. The template build may compile java classes and use a specific extension that loads all of the software components into a same uber jar.

For example, the software developer may enter a simple command path "java-jar <path-to-application.jar> that causes the software development tool 102 in FIG. 2 to download the software components identified by the selected templates into a file system and then package the downloaded components into a single java uber jar that stores the software components in one file. The uber-jar may contain all the OSGi bundles (dependencies) needed for loading and deploying the software application and any associated services. If additional software services are added, the software components may be added to the previously packaged uber jar.

Software development tool 102 may load all the OSGi bundles directly from a local repository, which may significantly reduce build/packaging time. In another example, the software development tool may include sets of compatible OSGi bundles automatically downloaded and packaged based on dependencies.

Streamlining Software Development for Legacy Software Systems

As mentioned above, a software developer may need to create new software services in conjunction with existing legacy software systems. Previously, the developer may have created a new application, integrated the new application with a legacy software system, and then tested the new application to ensure correct operability within the legacy software system. The additional integration and testing with the legacy software system increased software development time. Release of the new software application also may be limited to pre-scheduled release dates for the legacy software system.

Figure 5:
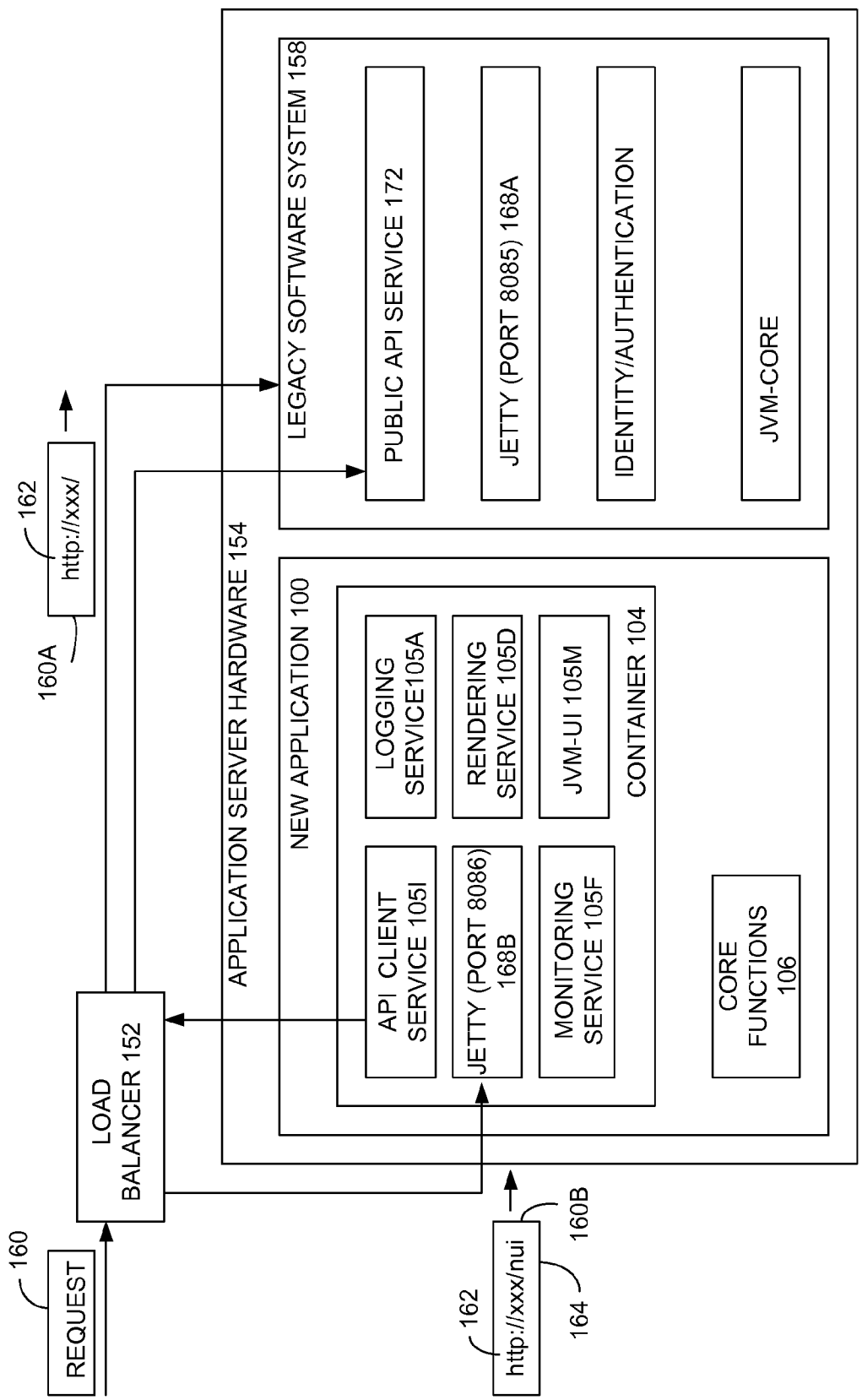
FIG. 5 shows an example template based application launched in conjunction with a legacy software system.

FIG. 5 shows on example of how a new template based application may be quickly created and launched independently of existing legacy software system 158. In this example, the developer uses one or more templates to create a new software application 100 that operates in conjunction with a legacy software system 158. In one example, legacy software system 158 may comprise a customer relationship management (CRM) system and the software developer may use template 108A in FIG. 2 to create new user interface (UI) tier application 100.

Template 108A in FIG. 2 may build a container 104 of support services 105 that operate in conjunction with a legacy software system 158. For example, new application 100 may include logging service 105A, rendering service 105D, monitoring service 105F, API client service 105I, and a java virtual machine (JMV) UI 105M. In addition to services 105, template 108A may also build additional core functions 106 added by the software developer.

New software application 100 and legacy software system 158 may operate on application server hardware 154 located within database system 16 described above in FIGS. 1A and 1B. In another example, new application 100 and legacy software system 158 may operate on different server hardware. In at least one example, new application 100 and legacy software system 158 may operate within the multi-tenant space 28 described above in FIGS. 1A and 1B. Of course new application 100 and legacy software system 158 may operate on any software platform and include any functionality.

In this example, legacy software system 158 is assigned a first port address 168A and new application 100 is assigned a second port address 168B. A client operating on one of user systems 12 described above in FIGS. 1A and 1B may use a universal resource locator (URL) address to direct requests 160 either to legacy software system 158 or to new application 100.

In one example, the client on the user system may operate within a web browser. A user may use the web browser to access different webpages operated either by new application 100 or legacy software system 158. A user may access a first webpage provided by legacy software system 158. The user may send a first request 160A to legacy software system 158 via the first webpage. The first webpage sends request 160A that includes a URL 162 to a load balancer 152. Load balancer 152 forwards request 160A with URL 162 to port address 168A on legacy software system 158.

In response to request 160A, legacy software system 158 may send another webpage or display a link. The user may send a second request 160B via the second webpage or link. The second request 160B may include the same URL 162 but with an additional prefix 164. Load balancer 152 directs any messages with URL 162 and prefix 164 to new application 100.

While operating in conjunction with legacy software system 158, new application 100 also may operate independently and outside of legacy software system 158. Further, at least some combination of services 105 in container 104 and/or core functions 106 may have previously been tested in conjunction with legacy software system 158. Thus, the software developer may need less time to develop and test new software application 100.

New application 100 may use API client service 105I to access data associated with legacy software application 158. For example, new application 100 may use API client service 105I to call a public API service 172 and access configuration data and/or other client data generated by legacy system 158.

In another example, new application 100 may comprise an authentication application that operates in conjunction with a login service operating within legacy system 158. One of templates 108 in FIG. 2 may identify software components for creating an authentication application 100. The software developer selects the authentication template and may add additional code to the template for any additional core functionality.

The software developer uses a software development tool, such as Maven, to download the software components from either public and/or private repositories identified by the authentication application template and package all of the software components into a single java uber jar. The developer deploys the authentication application 100 contained in the java uber jar on application server hardware 154 in conjunction with legacy software system 158.

After launching authentication application 100, a user may access legacy system 158 and enter a username and password. After confirming the username and password, legacy system 158 may display a link to authentication application 100. The user may select the link sending a request 160B with a URL associated with authentication application 100. In response to request 160B, authentication application 100 may display a webpage or popup window prompting the user to enter a cell phone number. In response to receiving the cell phone number, authentication application 100 then may send a secret code to the cell phone number. The user may enter the secret code into the previously displayed login webpage to access other applications operating within legacy software system 158.

Thus, the template quickly downloads, packages, and launches authentication application 100 independently from legacy software system 158. The template includes a container 104 of services 105 used for operating in conjunction with legacy software system 158 relieving the software developer from identifying, building, and testing the associated software components. While shown operating in conjunction with legacy system 158, the software developer also may use the templates to create stand-alone software applications.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A software development database system for creating a custom software application for operation within the database system, the database system comprising:
a processing system including a processor; and
a memory device coupled to the processing system, the memory device having instructions stored thereon that, in response to execution by the processing system, cause the processing system to perform operations comprising:
storing in a library of the database system and by the processing system, hierarchical lower tier templates including sets of multiple sub tier templates, wherein each of the sub tier templates further identify groups of prearranged, previously built, and previously tested software services for an associated category of core lower tier software functions for operating with a legacy software application, wherein the lower tier templates further include the core lower tier software functions;
storing in the library, by the processing system, hierarchical upper tier templates each including a set of multiple lower tier templates, wherein each of the upper tier templates further identify a prearranged group of the groups of software services configured to operate as a container of prearranged, previously built, and previously tested group of software services for an associated category of core upper tier software functions that operate with the legacy software application, wherein the upper tier templates further include the core upper tier software functions;

receiving, by the processing system, a selection of one of the upper tier templates from the library that identifies, links, and downloads a first prearranged group of the group of the software services for the associated core upper tier software functions;

receiving, by the processing system, a selection of one of the lower tier templates from the library that identifies, links, and downloads a second prearranged group of the group of software services for the associated core lower tier software functions;

receiving, by the processing system, a selection of a custom set of core software functions not included in any of the upper tier templates or lower tier templates in the library;

building, by the processing system, the custom software application by combining the first group of core upper tier software functions identified in the selected one of the upper tier templates, the second group of core lower tier software functions identified in the selected one of the lower tier templates, and the custom set of core software functions identified in the selected custom set of core software functions; and executing, by one or more virtual machines of the processing system, the custom software application.

2. The software development database system of claim 1, wherein the first prearranged group of software services support a user interface (UI) tier category of core upper tier software functions.

3. The software development database system of claim 2, wherein an additional one of the upper tier templates identifies an additional prearranged group of software services that support a headless application category of core upper tier software functions.

4. The software development database system of claim 1, wherein the upper tier templates and lower tier templates include extensible markup language (XML) code identifying the core upper tier and lower tier software functions.

5. The software development database system of claim 1, further comprising:
packaging, by the processing system, the downloaded first group of prearranged software services and the downloaded second group of prearranged software services into a single java uber jar.

6. The software development database system of claim 1, further comprising:
assigning, by the processing system, a first port address to the custom software application; and
launching, by the processing system, the custom software application in conjunction with a legacy software system having a second port address, wherein a client operating the database system uses the first port address to access the custom software application and uses the second port address to access the legacy software system.

7. The software development database system of claim 6, wherein at least one of the lower tier templates in the selected one of the upper tier templates identifies a group of software services providing an application programmer interface (API) client for accessing an API service in the legacy software system.

8. A method for developing a custom software application for operating within a database system, comprising:
storing, by the database system and in a library of the database system, hierarchical lower tier templates including sets of multiple sub tier templates, wherein each of the sub tier templates further identify groups of prearranged, previously built, and previously tested software services for an associated category of core lower tier software functions for operating with a legacy software application, wherein the lower tier templates further include the core lower tier software functions;

storing, by the database system and in the library, hierarchical upper tier templates including one or more lower tier templates, wherein each of the upper tier templates further identifying a prearranged group of the groups of software services configured to operate as a container of prearranged, previously built, and previously tested group of software services for an associated category of core upper tier software functions that operate with the legacy software application, wherein the upper tier templates further include the core upper tier software functions;

receiving, by the database system, a selection of one of the upper tier templates from the library that identifies, links, and downloads a first prearranged group of the group of the software services for the associated upper tier software functions;

receiving, by the database system, a selection of one of the lower tier templates from the library that identifies, links, and downloads a second prearranged group of the group of software services for the associated lower tier software functions;

receiving, by the database system, a selection of a custom set of core software functions not included in any of the upper tier templates or lower tier templates;

building, by the database system, the custom software application by combining the first group of upper tier software functions identified in the selected one of the upper tier templates, the second group of core lower tier software functions identified in the selected one of the lower tier templates, and the custom set of core software functions identified in the selected custom set of core software functions; and executing, by one or more virtual machines of the database system, the custom software application.

9. The method of claim 8, further comprising:
receiving, by the database system, a first request from a user of the database system communicating with an enterprise software system, the first request having a first address;
sending, by the database system, the first request to the enterprise software system;
receiving, by the database system, a second request from the user of the database system while communicating with the enterprise software system, the second request having a second address; and
sending, by the database system, the second request to the custom software application.

10. The method of claim 8, further comprising:
receiving, by the database system, a selection of one of the lower tier templates identifying software services for an application programmer interface (API) client service;

combining, by the database system, the software services for the API client service with the software services identified in the selected one of the upper tier templates;

building, by the database system, the custom software application with the API client service;

receiving, by the database system, a data request from the API client service; and sending, by the database system, the data request to a public API service in an enterprise software system.

11. The method of claim 8, further comprising:

packaging, by the database system, the first group of prearranged software services identified in the selected one of the upper tier templates and the selected set of custom core software functions into a java uber jar; and generating, by the database system, a digital certificate for the java uber jar preventing modification to the custom application.

12. A computer program stored on a non-transitory tangible medium for a database system, the computer program comprising a set of instructions operable to:

store, by the database system and in a library of the database system, hierarchical lower tier templates including sets of multiple sub tier templates, wherein each of the sub tier templates further identify groups of prearranged, previously built, and previously tested software services for an associated category of core lower tier software functions for operating with a legacy software application, wherein the lower tier templates further include the core lower tier software functions;

store, by the database system and in the library, hierarchical upper tier templates including one or more lower tier templates, wherein each of the upper tier templates further identify a prearranged group of the groups of software services configured to operate as a container of prearranged, previously built, and previously tested group of software services for an associated category of core upper tier software functions that operate with the legacy software application, wherein the upper tier templates further include the core upper tier software functions;

receive, by the database system, a selection of one of the upper tier templates from the library that identifies, links, and downloads a first prearranged group of the group of the software services for the associated upper tier software functions;

receive, by the database system, a selection of one of the lower tier templates from the library that identifies, links, and downloads a second prearranged group of the group of software services for the associated lower tier software functions;

receive, by the database system, a selection of a custom set of core software functions not included in any of the upper tier templates or lower tier templates;

build, by the database system, the custom software application by combining the first group of upper tier software functions identified in the selected one of the upper tier templates, the second group of core lower tier software functions identified in the selected one of the lower tier templates, and the custom set of core software functions identified in the selected custom set of core software functions; and execute, by one or more virtual machines of the database system, the custom software application.

13. The computer program of claim 12, wherein:

the selected one of the upper tier templates identifies the first group of prearranged software services for a user interface tier application; and an additional one of the upper tier templates identifies the first group of prearranged software services for a headless application.

14. The computer program of claim 12, wherein the first and the second prearranged groups of software services include a logging service, an error reporting service, a rendering service and a monitoring service.

* * * * *